(12) United States Patent
Utsuno (10) Patent No.: US 8,823,328 B2
(45) Date of Patent: Sep. 2, 2014

(54) CHARGING APPARATUS THAT CAN RECHARGE DIFFERENT TYPES OF BATTERIES WITHOUT OVERCHARGING THEM

(75) Inventor: Kikuo Utsuno, Miyzaki (JP)

(73) Assignee: Lapis Semiconductor Co., Ltd., Yokohama (JP)

( * ) Notice: Subject to any disclaimer, the term of this patent is extended or adjusted under 35 U.S.C. 154(b) by 348 days.

(21) Appl. No.: 13/226,402

(22) Filed: Sep. 6, 2011

(65) Prior Publication Data

US 2012/0056578 A1 Mar. 8, 2012

(30) Foreign Application Priority Data

Sep. 7, 2010 (JP) ................................. 2010-199806

(51) Int. Cl.
*H01M 10/46* (2006.01)
*H02J 7/35* (2006.01)
*H02J 7/00* (2006.01)

(52) U.S. Cl.
CPC ........... *H02J 7/35* (2013.01); *H02J 2007/0037* (2013.01); *H02J 7/0031* (2013.01)
USPC ....................................................... 320/134

(58) Field of Classification Search
USPC .......................................... 320/101, 134, 136
See application file for complete search history.

(56) References Cited

U.S. PATENT DOCUMENTS

| 6,992,463 B2 * | 1/2006 | Yoshio .......................... 320/134 |
| 2008/0143292 A1 * | 6/2008 | Ward .............................. 320/101 |
| 2008/0224667 A1 * | 9/2008 | Tanaka et al. .................. 320/139 |

FOREIGN PATENT DOCUMENTS

| JP | 09-121461 A | 5/1997 |
| JP | 09-163619 A | 6/1997 |
| JP | 09-261861 A | 10/1997 |
| JP | 10-336914 A | 12/1998 |
| JP | 2000-112548 A | 4/2000 |
| JP | 3104747 U | 10/2004 |
| JP | 2007-166723 A | 6/2007 |
| JP | 2009-106117 A | 5/2009 |

* cited by examiner

*Primary Examiner* — Edward Tso
(74) *Attorney, Agent, or Firm* — Rabin & Berdo, P.C.

(57) ABSTRACT

A charging device can prevent overcharging by coping with a plurality of cell voltages without increasing a circuit area and current consumption. The charging device selects one of at least two judgment voltages in response to a select signal determined depending on a chargeable voltage of a secondary battery. The charging device compares a comparison voltage based on a voltage of a lower stream of a back flow prevention unit with the selected judgment voltage to detect a fully charged state of the secondary battery. The charging device interrupts supply of charging current to the back flow prevention unit upon detecting the fully charged state.

17 Claims, 5 Drawing Sheets

CHARGING APPARATUS THAT CAN RECHARGE DIFFERENT TYPES OF BATTERIES WITHOUT OVERCHARGING THEM

BACKGROUND OF THE INVENTION

1. Field of the Invention

The present invention relates to a charging apparatus that can prevent overcharging of a secondary battery.

2. Description of the Related Art

A so-called secondary battery (also referred to as a storage battery, accumulator or rechargeable battery) that is repeatedly usable as a battery by being charged again and again is known in the art. When charging the secondary battery, measures to deal with overcharging of the secondary battery are taken to prevent breakdown or damage of the secondary battery. For example, Japanese Patent Application Publication (Kokai) No. 9-261861 discloses an apparatus for such purpose. When a voltage across a secondary battery becomes higher than or equal to a predetermined value, an N-channel power metal oxide semiconductor field effect transistor (MOSFET) connected in parallel to a solar cell is turned on to interrupt charging current from the solar cell to the battery, thereby preventing overcharging of the secondary battery.

SUMMARY OF THE INVENTION

Recently, many types of secondary batteries are introduced in the market. In some cases, a plurality of secondary batteries having different cell voltages are used in one system. In this system, use of the secondary batteries must be switched properly depending on the type of an application and/or the operating state of the system. Thus, a plurality of charging apparatus for the respective cell voltages of the secondary batteries are required. To prepare a circuitry capable of coping with a plurality of cell voltages may encounter an increase in circuit area and/or an increase in current consumption. For example, a circuit capable of coping with a high cell voltage may be configured by employing a step-down circuit that has a large step-down value. However, in order to make the step-down value large with small current, there is a need to elongate the length of the gate of a transistor in the step-down circuit. This results in an increase in circuit area. Alternatively, when the step-down value must become large without elongating the gate length of the transistor, there is a need to make a current value large. This results in an increase in current consumption.

It is an object of the present invention to provide a charging apparatus which is capable of preventing overcharging by coping with a plurality of cell voltages without increasing a circuit area and current consumption.

According to one aspect of the present invention, there is provided a charging apparatus for supplying a charging current to a secondary battery through a back flow prevention unit. The charging apparatus includes a detector for selecting one of at least two judgment voltages in response to a select signal determined depending on a chargeable voltage of the secondary battery and comparing a comparison voltage based on a voltage of a lower stream of the back flow prevention unit with the selected judgment voltage to detect a fully charged state of the secondary battery. The charging apparatus also includes an interrupter for interrupting the supply of the charging current to the back flow prevention unit when the comparison detector detects the fully charged state.

The charging apparatus of the present invention can prevent overcharging by coping with a plurality of cell voltages without increasing a circuit area and current consumption.

BRIEF DESCRIPTION OF THE DRAWINGS

The above and other objects, aspects, features and advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings.

First Embodiment

Figure 1:
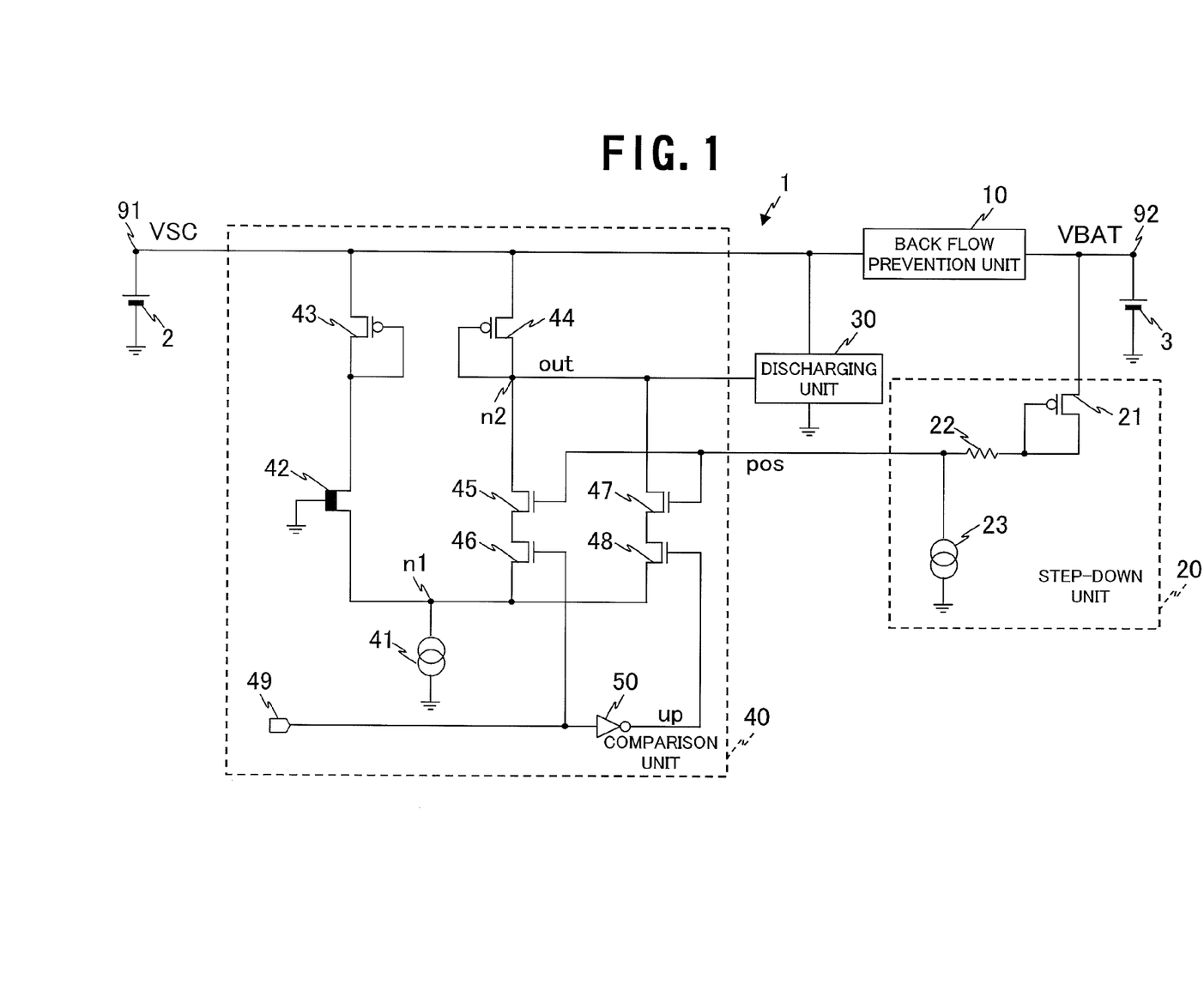
FIG. 1 is a block diagram showing the configuration of a charging apparatus of a first embodiment together with a solar cell and a secondary battery.

Referring to FIG. 1, a charging apparatus 1 of a first embodiment is equipped with a solar cell 2 and a secondary battery 3. The solar cell 2 is a charging current supply source. The charging apparatus 1 prevents back flow of a charging current supplied from the solar cell 2 to an input terminal 91 and supplies the charging current to the secondary battery 3. The secondary battery 3 is connected to an output terminal 92. The charging apparatus 1 also has a function of preventing overcharging of the secondary battery 3. The charging apparatus 1 includes a back flow prevention unit 10, a step-down unit 20, a discharging unit 30, and a comparison unit 40.

The back flow prevention unit 10 is a circuit that prevents back flow of a current from the secondary battery 3 to the solar cell 2. In this specification, the solar cell 2 side of the back flow prevention unit 10 will be referred to as an upper stream, and the secondary battery side of the back flow prevention unit 10 will be referred to as a lower stream.

The step-down unit 20 is a circuit that causes a voltage VBAT of the secondary battery 3 to drop by a certain voltage, for example 1V, to generate a step-down voltage pos, and supplies the step-down voltage pos to the comparison unit 40. That is, the step-down unit 20 supplies a voltage (step-down voltage pos) lower than an operating voltage of the comparison unit 40 to the comparison unit 40 such that the comparison unit 40 can perform a normal comparison process. Hereinafter, the step-down voltage pos may also be referred to as a comparison voltage pos.

The step-down unit 20 includes a PMOS transistor 21, a resistor 22, and a constant current source 23. The PMOS transistor 21 has a source connected to the secondary battery 3, a drain connected to the resistor 22, and a gate connected to the drain. The resistor 22 has one end connected to the constant current source 23 and the other end connected to the drain of the PMOS transistor 21. A voltage at the above-mentioned "one end" of the resistor is supplied as the step-down voltage pos to the comparison unit 40.

The discharging unit 30 is a circuit that discharges the charging current from the solar cell 2 to a ground voltage when an output voltage out from the comparison unit 40 has a certain level, for example, a low level. That is, the discharging unit 30 can prevent overcharging of the secondary battery 3 by interrupting the charging current to the secondary battery 3. In the following description, the discharging unit 30 may be referred to as an interrupter 30.

The comparison unit 40 compares the step-down voltage pos supplied from the step-down unit 20 with a judgment voltage generated by the comparison unit 40 and supplies the output voltage out corresponding to a result of the comparison to the discharging unit 30.

The comparison unit 40 includes a constant current source 41, a depletion NMOS transistor (referred to hereinafter as a DMOS) 42, enhancement PMOS transistors (referred to hereinafter as PMOSs) 43 and 44, enhancement NMOS transistors (referred to hereinafter as NMOSs) 45 to 48, a select signal input terminal 49, and an inverter 50.

The constant current source 41, DMOS 42, PMOSs 43 and 44 and NMOSs 45 to 48 constitute a differential comparator. The configuration of the comparison unit 40 will hereinafter be described in detail.

The constant current source 41 has one end connected to a reference voltage gnd and the other end connected to the source of the DMOS 42 at a node n1.

The source of the DMOS 42 is connected to the constant current source 41 at the node n1, the gate of the DMOS 42 is connected to the ground voltage, and the drain of the DMOS 42 is connected to the drain of the PMOS 43. In this manner, the DMOS 42 is source-follower connected (i.e., has a source-follower connection). The source of the PMOS 43 is connected to the solar cell 2, the gate of the PMOS 43 is connected to the drain thereof, and the drain of the PMOS 43 is connected to the drain of the DMOS 42. In this manner, the DMOS 42 and the PMOS 43 are connected in series. Hereinafter, a current path formed by the series connection of the DMOS 42 and PMOS 43 will be referred to as a reference current branch. The reference current branch includes a source-drain path of the DMOS 42.

The PMOS 44 has a source connected to the solar cell 2, a drain connected to the drain of the NMOS 45 at a node n2, and a gate connected to the drain of the PMOS 44. The source of the NMOS 45 is connected to the drain of the NMOS 46, the gate of the NMOS 45 is connected to the output of the step-down unit 20 (the above-mentioned "one end" of the resistor 22), and the drain of the NMOS 45 is connected to the drain of the PMOS 44 at the node n2. The source of the NMOS 46 is connected to the constant current source 41 at the node n1, the gate of the NMOS 46 is connected to the select signal input terminal 49, and the drain of the NMOS 46 is connected to the source of the NMOS 45. In this manner, the PMOS 44, the NMOS 45 and the NMOS 46 are connected in series. A current path formed by the series connection of the PMOS 44, NMOS 45 and NMOS 46 will be referred to as a first judgment current branch. The first judgment current branch includes a source-drain path of the NMOS 45.

The NMOS 47 has a source connected to the drain of the NMOS 48, a gate connected to the output of the step-down unit 20 (the above-mentioned "one end" of the resistor 22), and a drain connected to the drain of the PMOS 44 at the node n2. The source of the NMOS 48 is connected to the constant current source 41, the gate of the NMOS 48 is connected to the select signal input terminal 49 through the inverter 50, and the drain of the NMOS 48 is connected to the source of the NMOS 47. In this manner, the PMOS 44, the NMOS 47 and the NMOS 48 are connected in series. A current path formed by the series connection of the PMOS 44, NMOS 47 and NMOS 48 will be referred to as a second judgment current branch. The second judgment current branch includes a source-drain path of the NMOS 47. The first judgment current branch and the second judgment current branch are connected in parallel.

A select signal to turn on the NMOS 46 or NMOS 48 is sent to the select signal input terminal 49. Each of the NMOS 46 and NMOS 48 serves as a switching element that is turned on/off by the select signal. The select signal is introduced directly to the gate of the NMOS 46 and through the inverter 50 to the gate of the NMOS 48. The NMOS 46 is turned on when the select signal is high in level, and the NMOS 48 is turned on when the select signal is low in level. In this manner, the NMOS 46 operates as a switch to select the NMOS 45 among the NMOS 45 and NMOS 47, and the NMOS 48 operates as a switch to select the NMOS 47 among the two NMOSs 45 and 47. A combination of the select signal input terminal 49 and the inverter 50 may be referred to as a selector.

A voltage at the node n2, which represents the comparison result of the comparison unit 40, is supplied as the output voltage out to the discharging unit 30.

The operation of the charging apparatus 1 will hereinafter be described. It is assumed here that the threshold voltage of the DMOS 42 is Vtd, the threshold voltage of the NMOS 45 is Vt45, the threshold voltage of the NMOS 47 is Vt47, and Vt47 is higher than Vt45. The threshold voltage is a gate voltage to start conduction between a source and a drain.

Because the DMOS 42 is source-follower connected, a voltage at the node n1 to which the source of the DMOS 42 is connected is $-V_{td}$. If Vtd is, for example, $-0.6V$, the voltage at the node n1 is 0.6V.

When the select signal of the high level is supplied to the select signal input terminal 49, the NMOS 46 is turned on and the NMOS 48 is turned off. As a result, the NMOS 45 is selected from the two NMOS 45 and 47, and the voltage at the node n1, $-V_{td}$ (for example, 0.6V), is thus supplied to the source of the NMOS 45.

The NMOS 45 is turned on when the step-down voltage pos supplied from the step-down unit 20 to the gate of the NMOS 45 is higher than or equal to the sum of the voltage at the node n1, $-V_{td}$, and the threshold voltage of the NMOS 45, Vt45. A voltage obtained by this sum is a judgment voltage Vj to judge whether to perform a discharging process.

If Vtd is, for example, $-0.6V$ and Vt45 is, for example, 0.7V, the judgment voltage Vj is 1.3V ($=0.7V+\{-(-0.6V)\}$). When the step-down voltage pos is higher than or equal to the judgment voltage Vj, 1.3V, the NMOS 45 is turned on. The judgment voltage Vj may also be considered to be the sum of the absolute value of the threshold voltage of the DMOS 42, Vtd, and the threshold voltage of the NMOS 45, Vt45.

If the NMOS 45 is turned on, the output voltage out, which is the voltage at the node n2, becomes low in level. The output voltage out of the low level is supplied to the discharging unit 30, which then discharges the charging current from the solar cell 2 to the ground voltage. When the NMOS 45 is in an off condition, the output voltage out is high in level, so that the discharging unit 30 does not perform discharging.

Because the discharging process is performed when the step-down voltage pos becomes higher than or equal to the judgment voltage Vj, 1.3V, it is possible to prevent the secondary battery 3 from being overcharged.

When the select signal of the low level is given to the select signal input terminal 49, the NMOS 48 is turned on and the NMOS 46 is turned off. As a result, the NMOS 47 is chosen from the two NMOSs 45 and 47 and the voltage at the node n1, −Vtd (for example, 0.6V), is thus supplied to the source of the NMOS 47.

Hence, the NMOS 47 is turned on when the step-down voltage pos supplied from the step-down unit 20 to the gate of the NMOS 47 is higher than or equal to the sum of the voltage at the node n1, −Vtd, and the threshold voltage of the NMOS 47, Vt47. A voltage obtained by this sum is the judgment voltage Vj to judge whether to perform the discharging process.

If Vtd is, for example, −0.6V and Vt47 is, for example, 1.0V, the judgment voltage Vj is 1.6V (=1.0V+{−(−0.6V)}). When the step-down voltage pos is higher than or equal to the judgment voltage Vj, 1.6V, the NMOS 47 is turned on.

Upon turning on of the NMOS 47, the output voltage out, which is the voltage at the node n2, becomes low in level. The output voltage out of the low level is supplied to the discharging unit 30. The discharging unit 30 then discharges the charging current from the solar cell 2 to the ground voltage.

Because the discharging process is performed when the step-down voltage pos is higher than or equal to the judgment voltage Vj, 1.6V, it is possible to prevent the secondary battery 3 from being overcharged.

In this manner, an appropriate judgment voltage Vj to judge whether to perform the discharging process is selected by supplying the low-level signal or high-level signal to the select signal input terminal 49. In the above-described example, the value 1.3V or 1.6V is selected as the judgment voltage Vj.

As described above, according to the charging apparatus 1 of the first embodiment, one of the two judgment voltages Vj to determine whether to perform the discharging process is selected by selecting one of two NMOS transistors having different threshold voltages. Therefore, it is possible to perform an overcharging prevention process corresponding to two types of secondary batteries having different cell voltages. With this configuration, there is no need to make the step-down value of the step-down unit larger than the conventional one, and the increase in circuit area can also be avoided.

Figure 2:
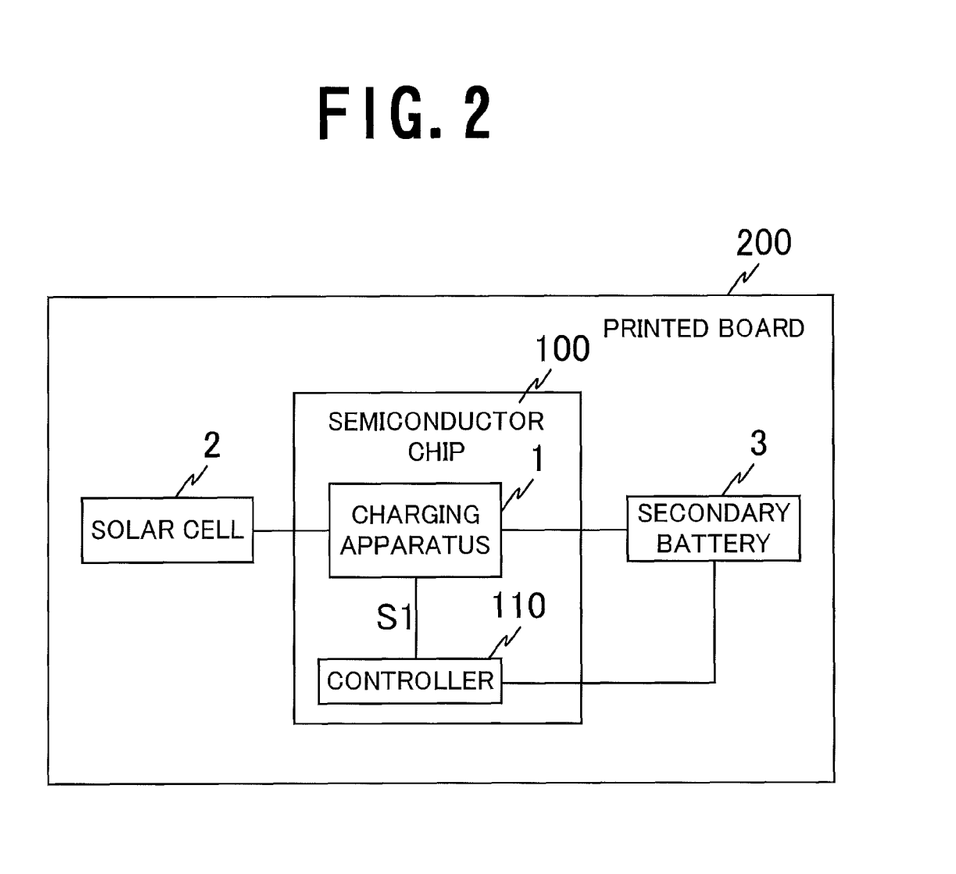
FIG. 2 is a block diagram showing the configuration of a system in which a semiconductor chip including the charging apparatus, the solar cell, and the secondary battery are mounted on a printed board.

FIG. 2 is a block diagram showing the configuration of a system in which a semiconductor chip 100 including the charging apparatus 1, the solar cell 2, and the secondary battery 3 are mounted on a printed board 200.

The charging apparatus 1 may be configured as a part of the semiconductor chip 100, such as a large scale integrated circuit (LSI). The semiconductor chip 100, the solar cell 2 and the secondary battery 3 may be mounted on the printed board 200. Provided in the semiconductor chip 100 is a controller 110 that determines (identifies) the type of the secondary battery 3 and sends a select signal S1 based on the determined type to the charging apparatus 1. In the charging apparatus 1, the judgment voltage Vj is selected depending on the signal level of the select signal S1. It should be noted that the select signal S1 may be supplied to the select signal input terminal 49 (FIG. 1) from the outside of the semiconductor chip 100.

Modification to First Embodiment

Figure 3:
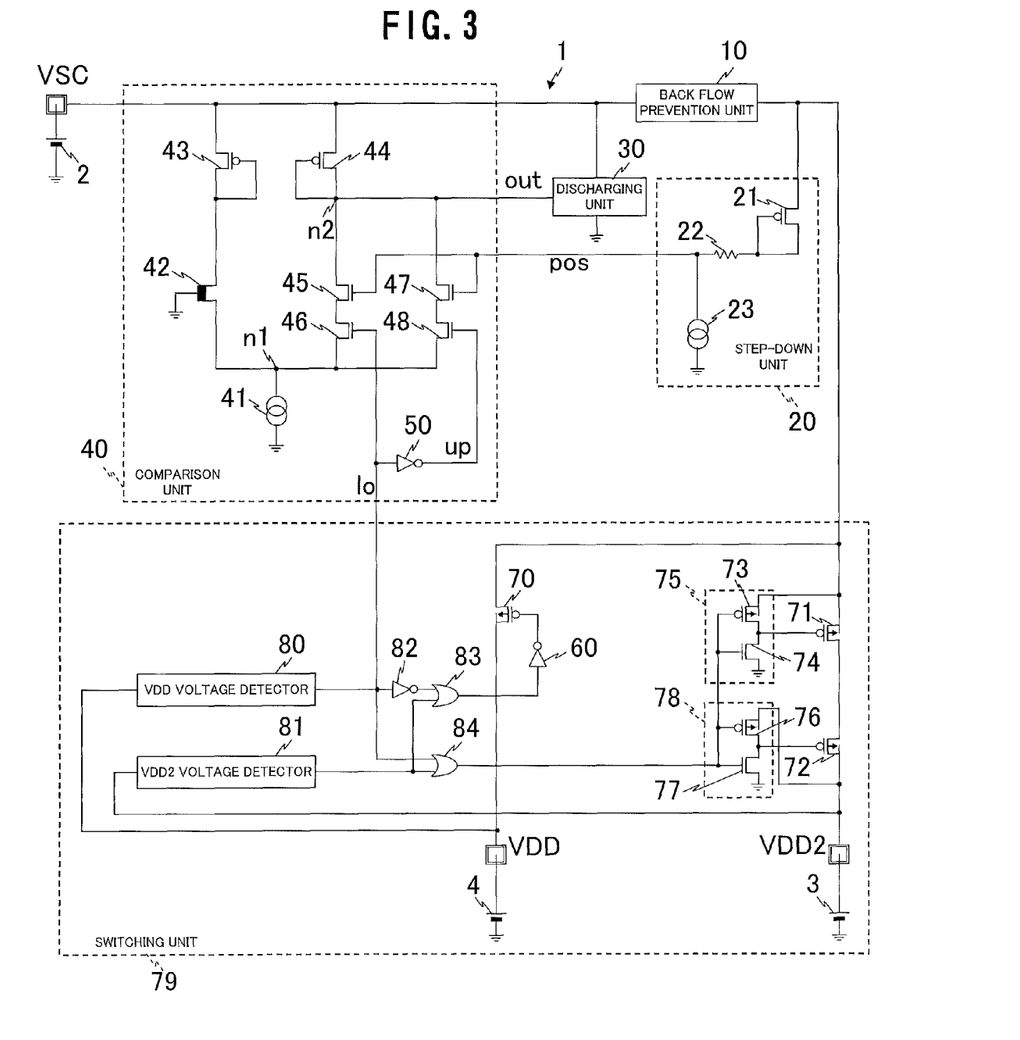
FIG. 3 is a block diagram showing the configuration of another charging apparatus according to the present invention, which is a modification to the first embodiment.

FIG. 3 is a block diagram showing the configuration of a charging apparatus 1 according to a modified embodiment of the first embodiment. A description will be mostly given of those parts and elements in this modification which are different from those in the first embodiment. Similar reference numerals and symbols are used to designate similar parts and elements in the first embodiment and its modification. The charging apparatus 1 of the modification prevents overcharging of a secondary battery (first supply destination) 3 of a relatively large capacity and another secondary battery (second supply destination) 4 of a relatively small capacity and performs a charging process while switching a charging current supply destination between the secondary battery 3 and the secondary battery 4. The charging apparatus 1 of FIG. 3 includes a switching unit 79. The configuration of the switching unit 79 will hereinafter be described.

A VDD voltage detector 80 has an input connected to VDD, and an output connected to an inverter 82 and a 2-OR 84. The input of the voltage detector 80 is also connected to an Io input of the comparison unit 40. A VDD2 voltage detector 81 has an input connected to VDD2, and an output connected to a 2-OR 83 and the 2-OR 84. The inverter 82 has an output connected to an input of the 2-OR 83.

A PMOS 70 has a drain connected to the solar cell 2 through the back flow prevention unit 10, a gate connected to an output of an inverter 60, and a source connected to the secondary battery 4. An output of the 2-OR 83 is introduced to the gate of the PMOS 70 through the inverter 60.

A PMOS 71 has a source connected to the solar cell 2 through the back flow prevention unit 10, a gate connected to an output of an inverter 75, which has a PMOS 73 and an NMOS 74, and a drain connected to the drain of a PMOS 72. The drain of the PMOS 72 is connected to the drain of the PMOS 71, the gate of the PMOS 72 is connected to an output of an inverter 78, which has a PMOS 76 and an NMOS 77, and the source of the PMOS 72 is connected to the secondary battery 3. In this manner, the PMOS 71 and the PMOS 72 are connected in series. An output of the 2-OR 84 is supplied to each of the inverter 75 and inverter 78.

It should be noted that a single PMOS may constitute the above-described combination of the PMOSs 71 and 72. However, the above-described two-PMOS configuration can prevent current from flowing from the charged voltage VDD2 of the secondary battery 3 to the charged voltage VDD of the secondary battery 4 even when VDD is lower than VDD2.

If the charged voltage VDD2 of the secondary battery 3 is lower than a predetermined value, the output of the VDD2 voltage detector 81 becomes low in level, and the PMOS 70, PMOS 71 and PMOS 72 are thus controlled by the output of the VDD voltage detector 80.

In this state, when the charged voltage VDD of the secondary battery 4 is lower than the predetermined value, the output of the VDD voltage detector 80 becomes low in level, thereby causing the PMOS 70 to turn on and the PMOS 71 and PMOS 72 to turn off. When the charged voltage VDD of the secondary battery 4 is higher than the predetermined value, the output of the VDD voltage detector 80 becomes high in level, thereby causing the PMOS 70 to turn off and the PMOS 71 and PMOS 72 to turn on. That is, the secondary battery 3 or 4 is selectively charged according to the output level of the VDD voltage detector 80.

If the charged voltage VDD2 of the secondary battery is higher than the predetermined value, the output of the VDD2 voltage detector 81 becomes high in level, thereby causing all the PMOS 70, PMOS 71 and PMOS 72 to turn on irrespective of the output of the VDD voltage detector 80. As a result, the secondary battery 3 and the secondary battery 4 are charged at the same time.

Figure 4:
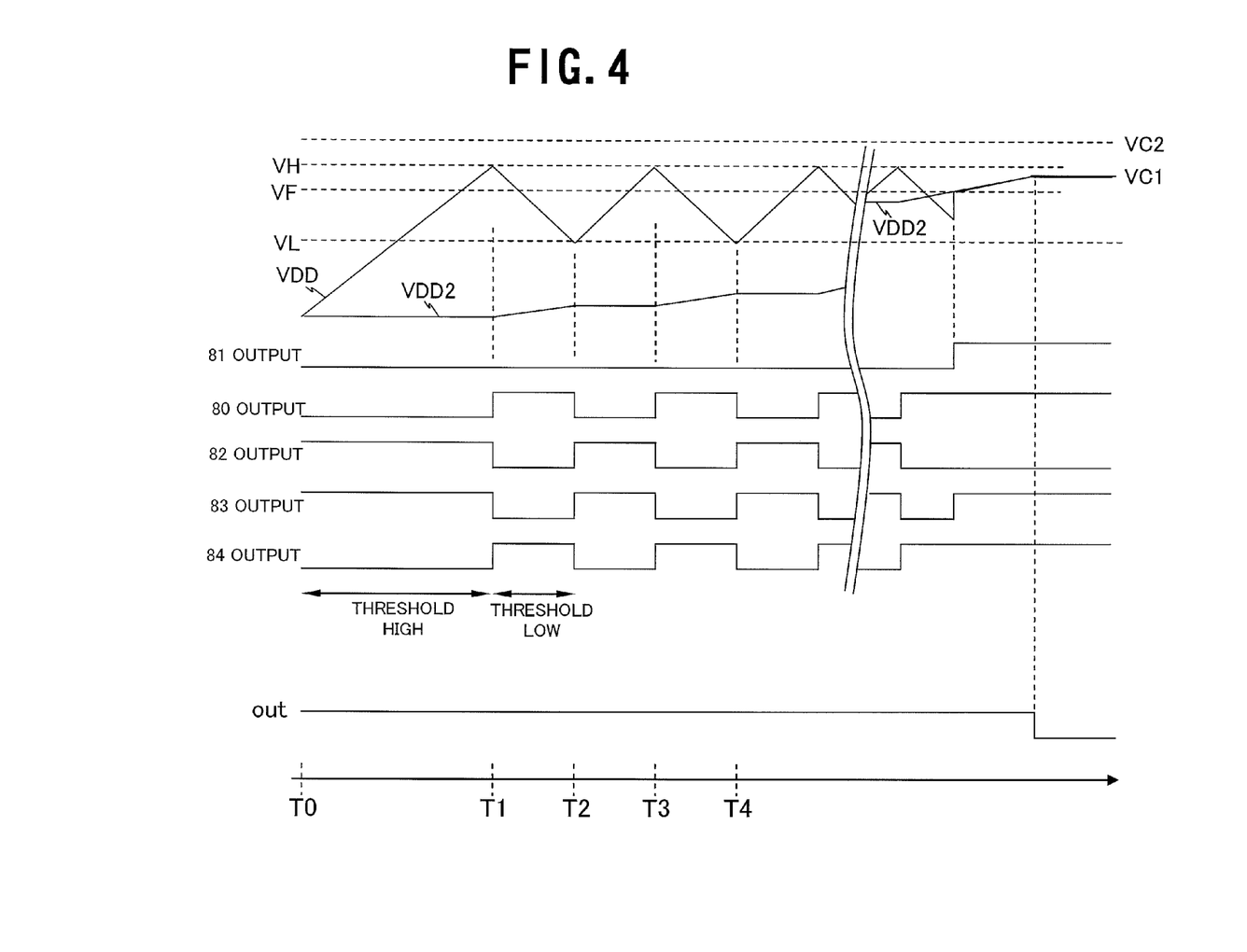
FIG. 4 is a timing chart illustrating voltages VDD and VDD2 and a comparison output voltage in the charging apparatus of FIG. 3.

FIG. 4 is a timing chart illustrating the charged voltage VDD of the secondary battery 4, the charged voltage VDD2 of the secondary battery 3, the outputs of the VDD voltage detector 80 and VDD2 voltage detector 81, the output of the inverter 82 and the outputs of the 2-OR 83 and 2-OR 84 in the charging apparatus 1. The operation of the charging apparatus 1 will be described with reference to FIG. 4.

It should be assumed here that the threshold voltage of the DMOS 42 is Vtd, the threshold voltage of the NMOS 45 is Vt45, the threshold voltage of the NMOS 47 is Vt47, and Vt47 is higher than Vt45. The secondary battery 4 has a smaller capacity than that of the secondary battery 3, but has a higher withstand voltage than that of the secondary battery 3.

At time T0, which is a charging start time, the secondary battery 3 and the secondary battery 4 are not sufficiently charged, and the outputs of the VDD voltage detector 80 and VDD2 voltage detector 81 are both low in level. As a result, the output of the inverter 82 becomes high in level, and the output of the 2-OR 83 thus becomes high in level, thereby causing the PMOS 70 to turn on. The output of the 2-OR 84 becomes low in level, and the PMOS and PMOS 72 are thus turned off, thereby causing the secondary battery 4 to be charged. The charged voltage of the secondary battery 4 is shown as VDD in FIG. 4. Although the NMOS 48 is also turned on, the step-down voltage pos is lower than the judgment voltage Vj. Thus, the NMOS 47 is in the off condition, and the output voltage out from the comparison unit 40 is high in level. Accordingly, the discharging unit 30 does not perform discharging.

When the output of the VDD voltage detector 80 is low in level, the NMOS 48 is turned on and the NMOS 46 is turned off. That is, the NMOS 47 with the relatively high threshold voltage is selected, and the judgment voltage Vj is set to a high value. In this example, the judgment voltage Vj is 1.6V (=1.0V+{-(-0.6V)}).

If the secondary battery 4 is gradually charged and the voltage VDD thereof reaches VH at time T1, the output of the VDD voltage detector 80 becomes high in level. As a result, the output of the inverter 82 becomes low in level, and the output of the 2-OR 83 thus becomes low in level, thereby causing the PMOS 70 to turn off. The output of the 2-OR 84 becomes high in level, and the PMOS 71 and PMOS 72 are thus turned on, thereby causing the secondary battery 3 to be charged. The charged voltage of the secondary battery 3 is indicated as VDD2 in FIG. 4.

Although the NMOS 46 is also turned on, the step-down voltage pos is lower than the judgment voltage Vj. Thus, the NMOS 45 is in the off condition, and the output voltage out from the comparison unit 40 is high in level. Accordingly, the discharging unit 30 does not perform discharging.

When the output of the VDD voltage detector 80 is high in level, the NMOS 46 is turned on and the NMOS 48 is turned off. As such, the NMOS 45 with the relatively low threshold voltage is selected, and the judgment voltage Vj is set to a low value. In this example, the judgment voltage Vj is, for example, 1.3V (=0.7V+{-(-0.6V)}).

If the secondary battery 3 is gradually charged, charges stored in the secondary battery 4 are gradually discharged due to current consumption in the system employing VDD as a voltage source. When the voltage VDD of the secondary battery 4 then reaches VL at time T2, the output of the VDD voltage detector 80 becomes low in level. As a result, the output of the inverter 82 becomes high in level, and the output of the 2-OR 83 thus becomes high in level, thereby causing the PMOS 70 to turn on. Also, the output of the 2-OR 84 becomes low in level, and the PMOS 71 and PMOS 72 are thus turned off, thereby causing the secondary battery 4 to be charged.

Although the NMOS 48 is also turned on, the step-down voltage pos is lower than the judgment voltage Vj. Thus, the NMOS 47 is in the off condition, and the output voltage out from the comparison unit 40 is high in level. As such, the discharging unit 30 does not perform discharging.

The same operation as the above-described operation is repeated after the time T2. In this manner, the secondary battery 4 of the relatively small capacity is repeatedly charged and discharged and the secondary battery 3 of the relatively large capacity is gradually charged.

If the voltage VDD2 of the secondary battery 3 reaches the threshold voltage VF of the VDD2 voltage detector 81, the output of the VDD2 voltage detector 81 becomes high in level and the outputs of the 2-OR 83 and 2-OR 84 thus become high in level irrespective of the output of the VDD voltage detector 80. Accordingly, the PMOS 70, PMOS 71 and PMOS 72 are all turned on, thereby causing the secondary batteries 3 and 4 to be charged at the same time.

If the secondary batteries 3 and 4 continue to be simultaneously charged and the voltage VDD of the secondary battery 4 reaches VH, the output of the VDD voltage detector 80 becomes high in level, and the NMOS 46 is turned on.

As the charging of the secondary batteries 3 and 4 proceeds and the voltage VDD of the secondary battery 4 reaches VC1, then the step-down voltage pos from the step-down unit 20 becomes higher than the judgment voltage Vj, thereby causing the output voltage out from the comparison unit 40 to become low in level. Accordingly, the discharging unit 30 performs discharging, so that the voltage VDD of the secondary battery 4 is stabilized at VC1.

The value of the judgment voltage Vj is switched in response to switching of a charging destination between the secondary battery 3 and the secondary battery 4 based on the voltage level of the charged voltage VDD of the secondary battery 4.

If the threshold voltage Vt47 of the NMOS 47 is set such that the sum of the step-down voltage pos of the step-down unit 20 and the judgment voltage Vj when the NMOS 47 of the comparison unit 40 is selected is higher than the high threshold voltage VH of the VDD voltage detector 80, then it is possible to gradually charge the secondary battery 3 without causing the discharging unit 30 to discharge the charging current, while increasing and decreasing the charged voltage VDD of the secondary battery 4 between VH and VL (FIG. 4).

In this manner, the charging apparatus 1 of this embodiment prevents overcharging and performs charging while switching a charging destination between the two secondary batteries 3 and 4. Since the secondary battery 4 of the relatively small capacity is charged within a short(er) time after the charging start, it may be used as a power source for start-up of the system (i.e., for early stage of activation of the system). However, if the secondary battery 4 is used as the power source for the start-up operation of the system, the voltage VDD thereof drops. For this reason, the secondary battery 3 of the relatively large capacity is charged while the secondary battery 4 is being used as the power source. In this manner, the secondary battery 3 of the relatively large capacity is charged to a sufficient amount while the secondary battery 4 of the relatively small capacity is being used as the power source for the start-up operation of the system. Thus, the secondary battery 3 may be used as a power source for the normal operation of the system after it is sufficiently charged. This configuration of the charging apparatus 1 realizes stability in the early operation and subsequent normal operation of the system.

Second Embodiment

Figure 5:
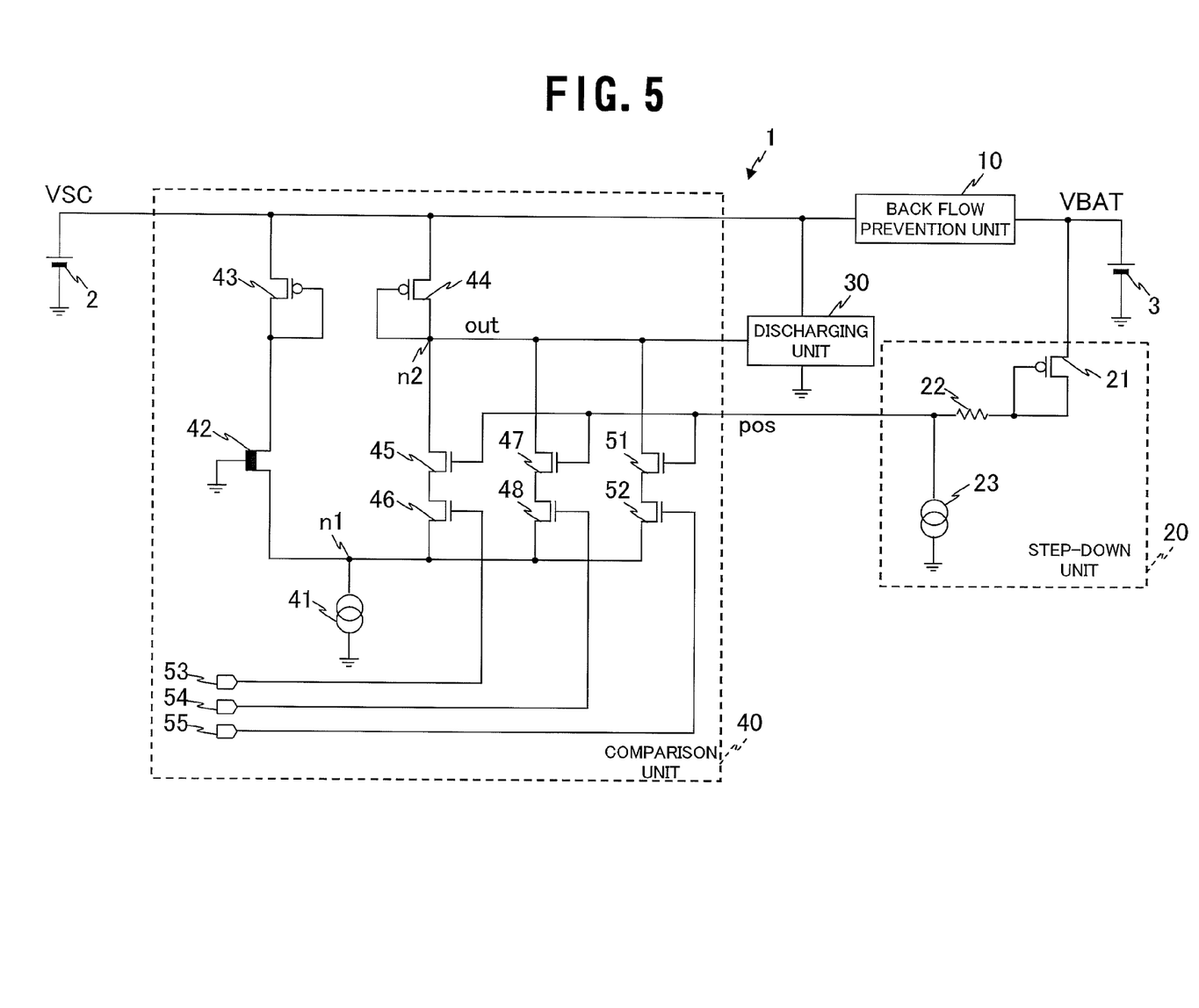
FIG. 5 is a block diagram showing the configuration of a charging apparatus of a second embodiment together with a solar cell and a secondary battery.

Referring to FIG. 5, a charging apparatus 1 of a second embodiment is illustrated together with a solar cell 2 and a secondary battery 3. A description will be mostly given of those parts and elements in the second embodiment which are different from those in the first embodiment. The charging apparatus 1 of the second embodiment does not include the select signal input terminal 49 and inverter 50 shown in FIG. 1 and includes NMOSs 51 and 52 and select signal input terminals 53 to 55 in the comparison unit 40. Similar reference numerals and symbols are used in the first and second embodiments when designating similar parts and elements.

The gate of the NMOS 46 is connected to the select signal input terminal 53. The gate of the NMOS 48 is connected to the select signal input terminal 54. Other connections of the NMOSs 45 to 48 are the same as those in the first embodiment.

The NMOS 51 has a source connected to the drain of the NMOS 52, a gate connected to the output of the step-down unit 20 (the one end of the resistor 22), and a drain connected to the drain of the PMOS 44 at the node n2. The source of the NMOS 52 is connected to the constant current source 41 at the node n1, the gate of the NMOS 52 is connected to the select signal input terminal 55, and the drain of the NMOS 52 is connected to the source of the NMOS 51. In this manner, the PMOS 44, the NMOS 51 and the NMOS 52 are connected in series. A current path formed by the series connection of the PMOS 44, NMOS 51 and NMOS 52 will be referred to as a third judgment current branch. The third judgment current branch includes a source-drain path of the NMOS 51.

The operation of the charging apparatus 1 will hereinafter be described. It should be assumed here that the threshold voltage of the DMOS 42 is Vtd, the threshold voltage of the NMOS 45 is Vt45, the threshold voltage of the NMOS 47 is Vt47, the threshold voltage of the NMOS 51 is Vt51, Vt51 is higher than Vt47, and Vt47 is higher than Vt45.

Because the DMOS 42 is source-follower connected, the voltage at the node n1 to which the source of the DMOS 42 is connected is −Vtd. If Vtd is, for example, −0.6V, the voltage at the node n1 is 0.6V.

When the select signal of the high level is sent only to the select signal input terminal 53 among the three select signal input terminals 53 to 55, the NMOS 46 is turned on and the NMOSs 48 and 52 are turned off. As a result, the NMOS 45 is selected among the NMOSs 45, 47 and the voltage at the node n1, −Vtd (for example, 0.6V), is thus supplied to the source of the NMOS 45.

Accordingly, the NMOS 45 is turned on when the step-down voltage pos supplied from the step-down unit 20 to the gate of the NMOS 45 is higher than or equal to a judgment voltage Vj obtained by the sum of the voltage at the node n1, −Vtd, and the threshold voltage of the NMOS 45, Vt45.

If Vtd is, for example, −0.6V and Vt45 is, for example, 0.7V, the judgment voltage Vj is 1.3V (=0.7V+{−(−0.6V)}). When the step-down voltage pos is higher than or equal to the judgment voltage Vj, 1.3V, the NMOS 45 is turned on.

Upon turning on of the NMOS 45, the output voltage out, which is the voltage at the node n2, becomes low in level. The output voltage out of the low level is supplied to the discharging unit 30. The discharging unit 30 then discharges the charging current from the solar cell 2 to the ground voltage.

As such, when the step-down voltage pos is higher than or equal to the judgment voltage Vj, 1.3V, the discharging process is performed, thereby making it possible to prevent the secondary battery 3 from being overcharged.

When the select signal of the high level is introduced only to the select signal input terminal 54 among the three select signal input terminals 53 to 55, the NMOS 48 is turned on and the NMOSs 46 and 52 are turned off. As a result, the NMOS 47 is chosen among the NMOSs 45, 47 and 51 and the voltage at the node n1, −Vtd (for example, 0.6V), is thus supplied to the source of the NMOS 47.

Hence, the NMOS 47 is turned on when the step-down voltage pos supplied from the step-down unit 20 to the gate of the NMOS 47 is higher than or equal to a judgment voltage Vj obtained by the sum of the voltage at the node n1, −Vtd, and the threshold voltage of the NMOS 47, Vt47.

If Vtd is, for example, −0.6V and Vt47 is, for example, 1.0V, the judgment voltage Vj is 1.6V (=1.0V+{−(−0.6V)}). When the step-down voltage pos is higher than or equal to the judgment voltage Vj, 1.6V, the NMOS 47 is turned on.

Upon turning on of the NMOS 47, the output voltage out, which is the voltage at the node n2, becomes low in level. The output voltage out of the low level is supplied to the discharging unit 30. The discharging unit 30 then discharges the charging current from the solar cell 2 to the ground voltage.

As such, when the step-down voltage pos is higher than or equal to the judgment voltage Vj, 1.6V, the discharging process is performed, and it is possible to prevent the secondary battery 3 from being overcharged.

When the select signal of the high level is supplied only to the select signal input terminal 55 among the three select signal input terminals 53 to 55, the NMOS 52 is turned on and the NMOSs 46 and 48 are turned off. As a result, the NMOS 51 is selected among the NMOSs 45, 47 and the voltage at the node n1, −Vtd (for example, 0.6V), is thus supplied to the source of the NMOS 51.

Hence, the NMOS 51 is turned on when the step-down voltage pos supplied from the step-down unit 20 to the gate of the NMOS 51 is higher than or equal to a judgment voltage Vj obtained by the sum of the voltage at the node n1, −Vtd, and the threshold voltage of the NMOS 51, Vt51.

If Vtd is, for example, −0.6V and Vt51 is, for example, 1.5V, the judgment voltage Vj is 2.1V (=1.5V+{−(−0.6V)}). When the step-down voltage pos is higher than or equal to the judgment voltage Vj, 2.1V, the NMOS 51 is turned on.

Upon turning on of the NMOS 51, the output voltage out, which is the voltage at the node n2, becomes low in level. The output voltage out of the low level is supplied to the discharging unit 30. The discharging unit 30 then discharges the charging current from the solar cell 2 to the ground voltage.

As such, when the step-down voltage pos is higher than or equal to the judgment voltage Vj, 2.1V, the discharging process is performed, thereby making it possible to prevent the secondary battery 3 from being overcharged.

As described above, according to the charging apparatus 1 of the second embodiment, one of the three judgment voltages Vj is selected by the input of the select signal to the select signal input terminals 53 to 55. Therefore, it is also possible to cope with three types of secondary batteries having different cell voltages.

Although the PMOSs 43 and 44 are employed in the comparison unit 40 in the first and second embodiments, resistors may be employed instead. Alternatively, constant current sources may be employed instead of the PMOS 43 and 44.

Although in the first and second embodiments the gate of the PMOS 43 in the comparison unit 40 is connected to the drain of the PMOS 43 and the gate of the PMOS 44 in the comparison unit 40 is connected to the drain of the PMOS 44, the gate of the PMOS 44 may be connected to the drain of the PMOS 43.

Although the output voltage VSC from the solar cell 2 is introduced to the source of each of the PMOSs 43 and 44 in the first and second embodiments, these sources may be connected to a separate power source (not shown).

Although the charging target is the secondary battery in the first and second embodiments, it may be a capacitor.

Although the voltage supply source is the solar cell in the first and second embodiments, it may be any other suitable power source than the solar cell.

Although the second embodiment is configured to select one of the three judgment voltages using the three NMOSs having different threshold voltages, it may be configured to select one of four (or more) judgment voltages using four (or more) NMOSs having different threshold voltages.

It should be noted that the preferred embodiments of the present invention have been disclosed for illustrative purposes. Those skilled in the art will appreciate that various changes, modifications, additions and substitutions can be made without departing from the scope and spirit of the invention as defined in the appended claims.

This application is based on Japanese Patent Application No. 2010-199806 filed on Sep. 7, 2010, and the entire disclosure thereof is incorporated herein by reference.

What is claimed is:

1. A charging apparatus for supplying a charging current to a secondary battery, comprising:
   a back flow prevention unit through which the charging current is supplied to the secondary battery;
   a constant current source;
   a detector, the detector including a reference current means for providing a reference current branch and a judgment current means for providing at least two judgment current branches, the reference current means and the judgment current means being connected between an input terminal of the back flow prevention unit and the constant current source, wherein the detector selects one of the judgment current branches in response to a select signal determined depending on a chargeable voltage of the secondary battery to generate a selected judgment voltage with the aid of the selected judgment branch and the reference current branch, and wherein the detector additionally compares a comparison voltage that is based on a voltage at an output terminal of the back flow prevention unit with the selected judgment voltage to detect a fully charged state of the secondary battery; and
   an interrupter for interrupting supply of the charging current to the back flow prevention unit when the detector detects that the secondary battery is in a fully charged state.

2. The charging apparatus according to claim 1,
   wherein the reference current means includes a source-drain path of a first field effect transistor having a gate that receives a reference voltage,
   wherein the judgment current means comprises a plurality of switches and a plurality of second field effect transistors, each of the judgment current branches including a source-drain path of a respective one of the second field effect transistors, which has a gate that receives a comparison voltage, and including one of the switches, the switch being switch connected in series with the source-drain path of the second field effect transistor, the switch being turned on when selected by the selector, and
   wherein the second field effect transistors have different gate voltages to start conductions between sources and drains thereof.

3. The charging apparatus according to claim 2, wherein the first field effect transistor is a depletion field effect transistor, and the second field effect transistors are enhancement field effect transistors.

4. The charging apparatus according to claim 2, wherein the reference voltage is a ground voltage.

5. The charging apparatus according to claim 2, further comprising a step-down unit for stepping down the voltage of the output terminal of the back flow prevention unit by a certain voltage and providing the stepped-down voltage as the comparison voltage.

6. The charging apparatus according to claim 2, wherein the select signal is given to the detector from an outside device that is separate from the charging apparatus.

7. The charging apparatus according to claim 2 further comprising a control unit for generating the select signal, wherein the control unit determines a type of the secondary battery and generates the select signal based on the type of the secondary battery.

8. The charging apparatus according to claim 2, wherein the interrupter interrupts the supply of the charging current to the back flow prevention unit by discharging the charging current.

9. A charging apparatus for supplying a charging current to a secondary battery, comprising:
   a back flow prevention unit through which the charging current is supplied to the secondary battery;
   a detector, the detector including means for providing at least two judgment voltages, for selecting one of the judgment voltages in response to a selection signal that is based on a chargeable voltage of the secondary battery, and for comparing a comparison voltage with the selected judgment voltage to detect a fully charged state of the secondary battery, the comparison voltage being based on a voltage at an output of the back flow prevention unit;
   an interrupter for interrupting supply of the charging current to the back flow prevention unit when the detector detects that the secondary battery is in a fully charged state; and
   a step-down unit for stepping down the voltage of the lower stream at the output of the back flow prevention unit by a certain voltage and providing the stepped-down voltage as the comparison voltage.

10. The charging apparatus according to claim 9, wherein the interrupter interrupts the supply of the charging current to the back flow prevention unit by discharging the charging current.

11. The charging apparatus according to claim 9, wherein current from the output of the back flow prevention unit is divided into a first supply destination and a second supply destination, and wherein the charging apparatus further comprises a switching unit for switching a supply destination of the charging current between the first supply destination and the second supply destination according to a result of the detection by the detector.

12. The charging apparatus according to claim 9, wherein the detector generates the detection result as the select signal.

13. The charging apparatus according to claim 9, wherein the first supply destination has a greater cell capacity than the second supply destination.

14. The charging apparatus according to claim 9, further comprising a control unit for generating the select signal, wherein the control unit determines a type of the secondary battery and generates the select signal based on the type of the secondary battery.

15. The charging apparatus according to claim 9, wherein the select signal is given to the detector from an outside device that is separate from the charging apparatus.

16. A system comprising:
   a printed circuit board;
   a secondary battery provided on the printed board;

a semiconductor chip mounted on the printed circuit board, the semiconductor chip having a charging apparatus for supplying a charging current to the secondary battery, the charging apparatus including:
- a back flow prevention unit through which the charging current is supplied to the secondary battery;
- a detector, the detector including means for providing at least two judgment voltages, for selecting one of the judgment voltages in response to a selection signal that is based on a chargeable voltage of the secondary battery, and for comparing a comparison voltage with the selected judgment voltage to detect a fully charged state of the secondary battery, the comparison voltage being based on a voltage at an output of the back flow prevention unit; and
- an interrupter for interrupting supply of the charging current to the back flow prevention unit when the detector detects that the secondary battery is and a fully charged state;

a solar cell provided on the printed board for supplying the charging current; and wiring for connecting the semiconductor chip, the charging apparatus, the secondary battery, and the solar cell.

17. The system according to claim 16, further comprising a control unit provided on the printed board for generating the select signal, wherein the control unit determines a type of the secondary battery and generates the select signal based on the type of the secondary battery.

* * * * *